Feb. 16, 1965 D. A. JOHNSTON ETAL 3,169,829
CONTINUOUS PROCESS FOR THE MANUFACTURE OF DECABORANE
Filed March 6, 1956
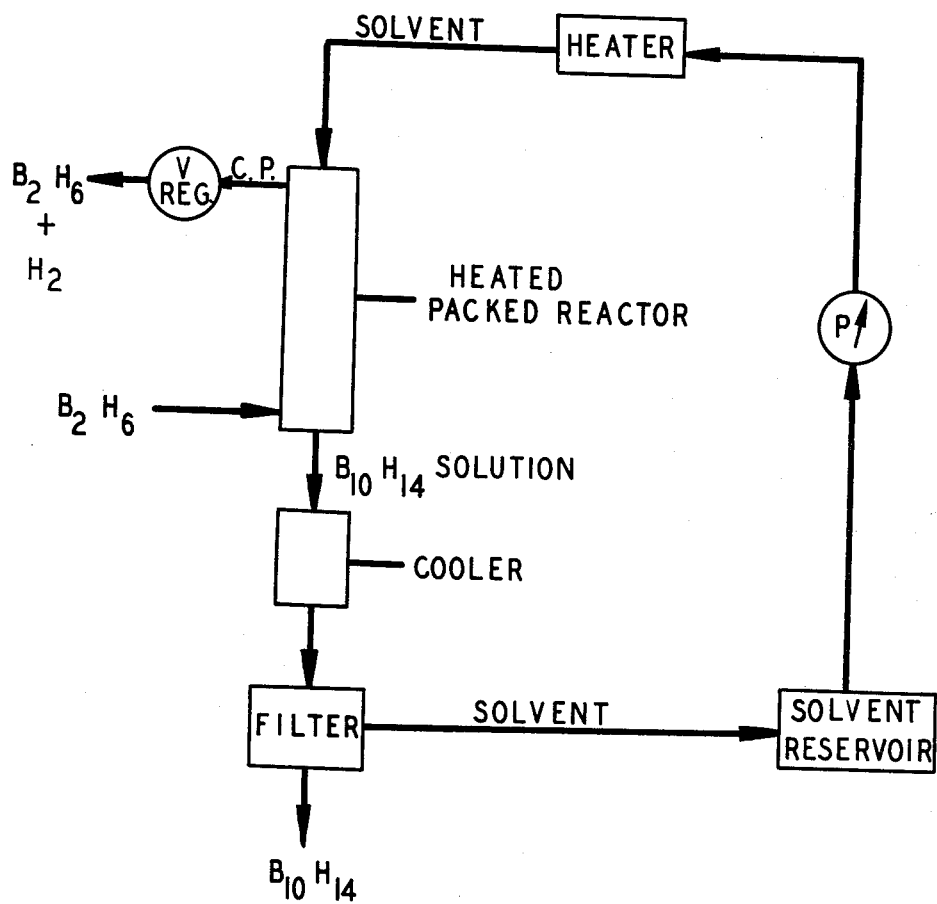
Dean A. Johnston
Charles R. Morrison
INVENTORS
BY Neal J. Mosely
their Attorney

3,169,829
**CONTINUOUS PROCESS FOR THE MANU-
FACTURE OF DECABORANE**
Dean A. Johnston, Evans City, Pa., and Charles R.
Morrison, Huntsville, Ala., assignors to Callery
Chemical Company, Pittsburgh, Pa., a corporation
of Pennsylvania
Filed Mar. 6, 1956, Ser. No. 569,785
1 Claim. (Cl. 23—204)

This invention relates to a continuous process for the manufacture of decaborane in good yields. More particularly, it relates to an improved process in which diborane is passed through a heated reactor countercurrent to an inert solvent and the decaborane is removed from the reaction zone as rapidly as it is formed.

Stock first prepared and characterized decaborane in 1913. For about forty years this compound remained a laboratory curiosity. Recently, however, considerable interest has developed in methods for preparing decaborane in high yields. Stock pyrolyzed diborane to obtain decaborane in yields of less than 10%. Diborane is still used today as a precursor of decaborane but methods have been found for increasing the yield of decaborane from this reaction. One of the main reasons for improved yields has been the discovery that decaborane decomposes at high temperatures and must be removed from the reaction zone immediately after it is formed. Until now, no method has been developed which would permit the continuous removal of the decaborane formed by the pyrolysis of diborane.

One object of this invention is to provide an economical and continuous process for the manufacture of decaborane.

Another object is to provide an improved process for preparing decaborane by the pyrolysis of diborane in which the decaborane is removed as rapidly as it is formed.

Other objects will become apparent as the invention is more fully disclosed hereinafter.

This invention is based upon the discovery that diborane can be pyrolyzed to decaborane in a continuous manner and in good yields by recycling an inert solvent, such as pentane, benzene or 2,3-dimethylbutane, in a packed scrubbing column countercurrent to the diborane. When the diborane is pyrolyzed, intermediate hydrides are formed which further react to form decaborane with the evolution of hydrogen. The $B_{10}H_{14}$ concentration is maintained at the desired level in the recycle stream by cooling and filtering out the precipitated $B_{10}H_{14}$. This removes the $B_{10}H_{14}$ from the reaction zone before further reaction can degradate the $B_{10}H_{14}$ to higher boron hydrides $(BH)_x$.

In the accompanying drawing there is shown a schematic flow sheet of the process disclosed.

In one experiment, the reactor consisted of a pipe 2" in diameter and 14" long which was packed with ⅜" Raschig rings. This reactor was maintained at 400 p.s.i.g. by means of a back pressure regulator in the off-gas line. Diborane was introduced at the bottom of the reactor at room temperature at an average rate of 0.0585 c.f.m. The inert solvent carrier (2,3-dimethylbutane) was circulated countercurrent through the reactor at the rate of 500 ml. per minute. The reactor was maintained at about 82° C., by a jacket of hot oil. The off-gas composition was about 55% $H_2$ throughout the entire run which lasted six hours. Infrared analyses of the liquid samples taken periodically during the run are shown in the table below. These analyses are on the solutions only and do not include the solids which precipitated from solution.

TABLE I

*Analysis of boron hydride concentrations in 2,3-dimethylbutane*

| Sample No. | Time. Hours | Mg. of hydride per ml. of solution | | |
|---|---|---|---|---|
| | | $B_4H_{10}$ | $B_5H_{11}$ | $B_{10}H_{14}$ |
| 1 | 0.5 | 6.9 | 10.2 | 3.7 |
| 2 | 1.0 | 8.0 | 10.9 | 11.3 |
| 3 | 2.0 | 5.2 | 8.5 | 18.5 |
| 4 | 3.0 | 6.8 | 9.9 | 19.3 |
| 5 | 4.5 | 7.4 | 13.1 | 36.2 |
| 6 | 6.0 | 6.9 | 11.7 | 42.6 |

From the data obtained it is readily apparent that the $B_4H_{10}$ and $B_5H_{11}$ concentrations remain essentially constant throughout the reaction while the $B_{10}H_{14}$ concentration builds up to a maximum which is the limit of its solubility in the solvent. This indicates that the pyrolysis reaction of diborane involves the formation of intermediate hydrides and that the rate of their appearance is equal to the rate of their disappearance in decaborane.

If desired other solvents for decaborane, may be used in this process, as for example, benzene, pentane or hexane. The process can also be made completely cyclic by returning the unconverted diborane and the higher hydrides formed to the reactor. By recirculating all the volatile boron hydride by-products, it is possible to obtain substantially quantitative yields of decaborane. The process disclosed may be operated at a temperature of 50–200° C. and at pressures from atmospheric to 2000 p.s.i.g. using diborane feed concentrations of 50–100%. The diborane is passed countercurrent to the solvent in a heated reactor and the decaborane formed leaves the reactor as a solution. The decaborane is removed from the solution by cooling and crystallization and the solvent is recirculated. If desired, the solvent may be separated from the decaborane by evaporation. The decaborane is filtered and further purified by sublimation. In this manner the decaborane is continuously removed as rapidly as it is formed and further decomposition is avoided.

In accordance with the patent statutes, this invention has been described fully and completely including what is now considered to represent one of its best embodiments. It should be understood, however, that other variations will become apparent to those skilled in the art and that within the scope of the appended claim, this invention may be practiced otherwise than as specifically described.

What we desire to particularly point out and distinctly claim as our invention is:

A process of manufacturing decaborane which comprises passing diborane through a packed column countercurrent to a stream of 2,3-dimethylbutane at a pressure of about 400 p.s.i.g. and a temperature of about 80° C., venting off the hydrogen evolved, removing a solution of decaborane dissolved in 2,3-dimethylbutane and recovering the decaborane from said solution.

References Cited in the file of this patent

Schechter et al.: "Boron Hydrides and Related Compounds," Jan. 8, 1951, pp. 13, 25–27, 37, declassified Jan. 5, 1954.

Schechter et al.: Report No. MSA–9973–FR, Dec. 1, 1950, pp. 2–7, declassified May 11, 1954.

Schlesinger et al.: MDDC–1338, Part I, May 24, 1944, pp. 2–3, declassified Sept. 19, 1947.

Hurd: Chem. of the Hydrides, p. 87.

Hurd: "J.A.C.S.," vol. 70, pp. 2053–2055, June 1948.